United States Patent [19]

Borkovsky et al.

[11] 3,777,308
[45] Dec. 4, 1973

[54] DEVICE FOR INFORMATION PLAYBACK IN MULTICHANNEL DIGITAL SEISMIC RECORDING SYSTEM

[76] Inventors: Gennady Mikhailovich Borkovsky, Khoroshevskoe shosse, 16, kv. 11; Alexander Alexandrovich Drozdov, ulitsa Valovaya, 6/8, kv. 75; Vladimir Markovich Kriesburg, ulitsa Junykh Lenintsev, 105 korpus 1, kv. 59; Anatoly Andreevich Tsukanov, Frunzenskaya Naberezhnaya 48, kv. 107, all of Moscow, U.S.S.R.

[22] Filed: July 6, 1972

[21] Appl. No.: 269,405

Related U.S. Application Data

[62] Division of Ser. No. 866,944, Oct. 16, 1969, abandoned.

[30] Foreign Application Priority Data
Oct. 16, 1968 U.S.S.R. ............................. 1277321
Dec. 26, 1968 U.S.S.R. ............................. 1294493

[52] U.S. Cl. 340/147 CN, 179/100.2 R, 340/15.5 GC
[51] Int. Cl. ........................ G01v 1/28, H03k 13/00
[58] Field of Search ............. 340/15.5 DP, 15.5 GC, 340/347 DA, 147 CN; 333/14; 330/51, 132; 346/33 C

[56] References Cited
UNITED STATES PATENTS

| | | | |
|---|---|---|---|
| 3,379,839 | 4/1968 | Bennett | 333/14 X |
| 3,518,678 | 6/1970 | Lawrence et al. | 340/15.5 GC |
| 3,562,504 | 2/1971 | Harris | 340/15.5 GC |
| 3,673,398 | 6/1972 | Loffbourrow | 340/347 DA |

*Primary Examiner*—Donald J. Yusko
*Attorney*—Eric H. Waters et al.

[57] ABSTRACT

A device for information playback in multichannel digital seismic recording systems based on the compression of the dynamic range of signals and consisting in that information recorded in digital multiplex form as values of signal samples in channels having respective gains is read off the carrier and converted into amplitude pulse multiplex signals accounting for the respective gains, thus recovering the original dynamic range of signals of a channel, compressing in a similar manner the recovered dynamic range of channel signals to a value acceptable for visual display, the channel signals obtained in the compressed dynamic range being demultiplexed and visually displayed.

2 Claims, 2 Drawing Figures

FIG. I

DEVICE FOR INFORMATION PLAYBACK IN MULTICHANNEL DIGITAL SEISMIC RECORDING SYSTEM

CROSS RELATED APPLICATION

This Application is a continuation of Ser. No. 866,944 filed Oct. 16, 1969 and now abandoned.

BACKGROUND a. Field of the Invention

The invention relates to devices for information playback in multichannel digital seismic recording systems.

b. Prior Art

In the known multichannel digital seismic recording systems, wide-range information recording is accomplished by devices having a small dynamic range but accurately preserving dynamic features within the entire range of recording. The information recorded by the digital system in a digital form is to be processed by a computer. To control the quality of an explosion and a proper operation of the equipment, each digital system is provided with a device for analog presentation of the results in the form of seismograms on oscillographic paper or on some other carrier, which depends or choosing the proper gain in a recording channel of the seismic system.

The dynamic range of seismic signals to be recorded in a digital form with minimum distortion is known to reach 120-140 db.

For recording information with such a range, various devices for a dynamic range compression during recording are used which provide complete recovery of a true dynamic range in a playback and introduction of the information into a computer.

This invention relates to devices for information playback in multichannel digital seismic systems.

The most complete and high-quality recording of information is provided by systems with binary amplifiers in a recording channel and by systems with an instantaneous multistage servo automatic gain control.

At present there exist a number of binary amplifier digital systems which comprise pre-amplifiers and binary amplifiers with a gain control, a multiplexer, a sample-hold, an analog-to-digital converter and a magnetic recorder in a recording channel, and a digital-to-analog converter, a demultiplexer, playback circuits for a continuous analog signal and a record visual display such as a bifilar oscillograph in a playback channel.

Said systems provide very good characteristics for recording channels but have complicated and expensive binary amplification systems thereby increasing the cost of such systems and decreasing their reliability and operational properties. Nevertheless, the playback channel of such a system is very simple due to the fact that the information at the output of the binary amplifiers is held, as in systems with automatic gain control, within a fairly small dynamic range and can be easily recorded in playback directly on a bifilar oscillograph since there is no need to record it with the same degree of accuracy.

One disadvantage of the playback channel is systems with binary gain consists of the absence of signal continuity in the presence of gain variation.

There is also known in the art a seismic field recording systems in which there is mounted after the pre-amplifiers a demultiplexer at whose output there is one binary amplifier common to all the channels. This system is simpler than the previous ones but it is rather bulky and inconvenient in operation since the recording channel contains a few dozen recording regime controls. Its playback channel is similar to that of the above-mentioned systems.

There also exists a system with an instantaneous servo automatic gain control in a recording channel instead of a binary gain system.

The latter system has a very simple recording channel and is very reliable and easy to handle. The system comprises pre-amplifiers with several outputs of fixed gain factor, switches, a sample-hold device, a servo gain control, an analog-to-digital converter, a timing unit, a multiplexer, a digital-to-analog converter, a dynamic range recovery system, a demultiplexer, an analog signal shaper and a visual recorder.

However, in this system, seismic signals, after their digital-to-analog conversion and dynamic range recovery, are presented in their full dynamic range and cannot be fed from the demultiplexers via analog signal shapers to galvanometers in a bifilar oscillograph due to their wide dynamic range.

In this case, in order to get a good reference record, a playback system for an analog signal should contain proper AGC systems for every trace. This makes the circuit of a playback channel bulky and unreliable thereby affecting identity of traces.

SUMMARY OF THE INVENTION

It is an object of the present invention to provide a device for information playback in multichannel digital seismic field recording systems which is simple and provides a low cost reliable seismic recording unit with a simple control system for analog representation of information which is achieved by simultaneous automatic gain control of all seismic channels.

In accordance with the invention, a device for information playback in multichannel digital seismic recording systems which record information in the form of a time multiplex of channels with a compression of dynamic range, comprises a digital-to-analog converter whose output is connected to the input of a dynamic range recovery system. A demultiplexer is provided whose input is connected to a dynamic range recovery system and whose output is connected to an oscillograph recorder via shapers of a continuous analog signal in each channel. The device, moreover contains, according to the invention, a unit for the automatic gain control of a signal at the output of said dynamic range recovery system with the input of this AGC unit being connected to the output of the dynamic range recovery system and the output thereof to the input of the demultiplexer.

The AGC unit may contain the main amplifier with a controlled gain factor, whose first input is connected to the output of dynamic range recovery system and whose output is connected to a demultiplexer and to the input of a feedback circuit whose output is connected to the second input of the main amplifier.

The device may comprise a switchable divider the output of which is connected to the third input of a feedback circuit, a multivibrator whose output is connected to the first input of said divider, and a time relay whose output is connected to the second input of said divider and to whose input a start signal for time marking is applied.

The device may also comprise a mixer for signals coming from the outputs of signal shapers of the central and two extreme opposite channels, the output of the mixer being connected to the input of the feedback circuit.

The proposed device having a fairly simple design based upon the simultaneous automatic control of all seismic channels in the common amplifier of the playback channel makes it possible to obtain an extremely economical and reliable digital seismic recording system with a simple control of analog representation of seismic information.

BRIEF DESCRIPTION OF THE DRAWING

The invention will be better understood from the following description thereof taken in conjunction with accompanying drawings, wherein.

DETAILED DESCRIPTION

Figure 1:
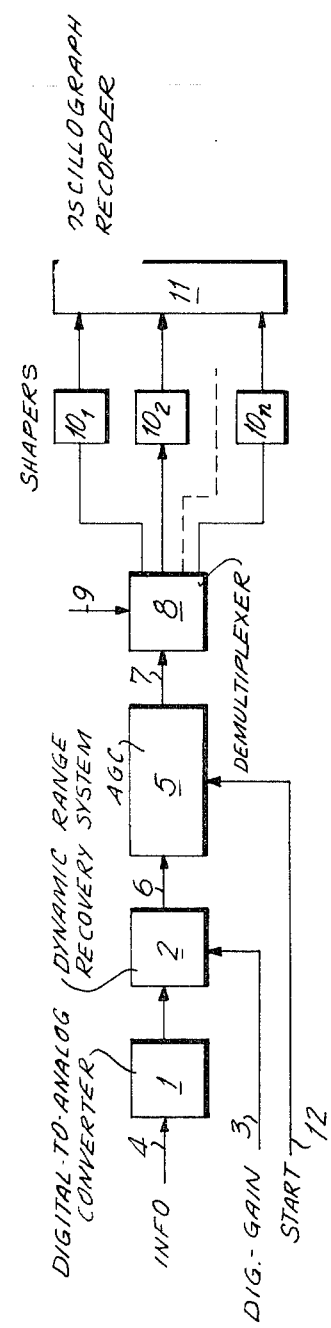
FIG. 1 is a block diagram of a principal circuit of a device for information playback according to the invention.
Figure 2:
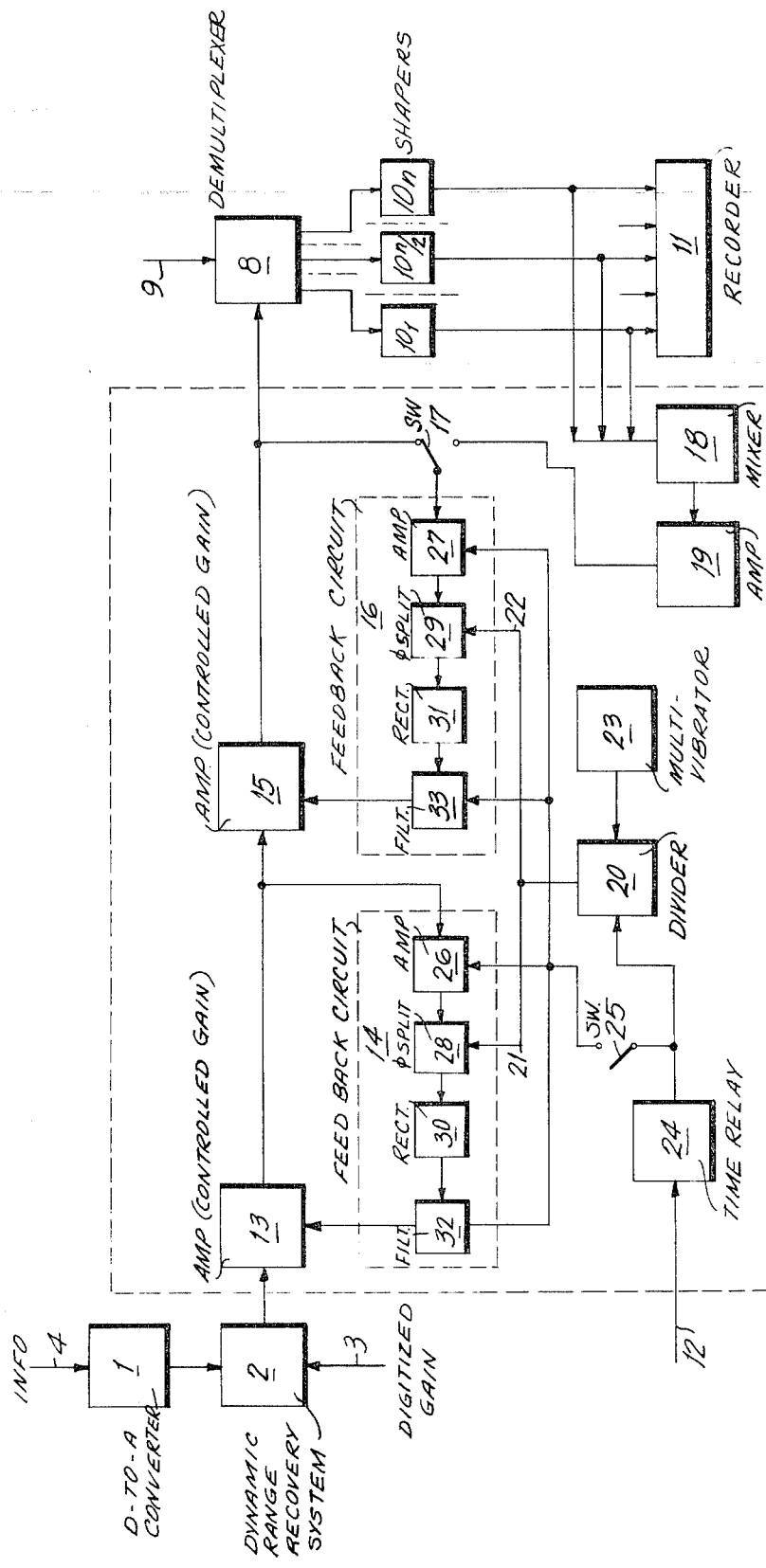
FIG. 2 shows one embodiment of the invention.

In the drawing, a device for information playback in multichannel digital seismic recording systems, which record information in the form of a time multiplex of channels with compression of the dynamic range, comprises a digital-to-analog converter 1, the output of which is connected to the first input of a dynamic range recovery system 2 to whose second input 3 come program pulses of digitized gain. Input 4 of converter 1 receives pulses of digitized recorded information.

According to the invention, the device comprises AGC unit 5 for a signal at the output of said recovery system 2. Inputs 6 of unit 5 is connected to the output of recovery system 2 and the output of unit 5 is connected to input 7 of the demultiplexer 8. The second input 9 of demultiplexer 8 receives clock pulses and its outputs are connected with the inputs of continuous analog signal shapers $10_1$, $10_2$ ... $10_n$ where $n$ is the number of channels of a digital seismic recording system. The outputs of shapers $10_1$, $10_2$ ... $10_n$ are connected to oscillograph recorder 11.

The second input 12 of unit 5 receives a start signal for the time marking of information recording.

According to the invention, AGC unit 5 comprises main amplifier 13 with a controlled gain factor whose first input is connected to the output of recovery system 2 and its output is connected to the input of feedback circuit 14, the output of the latter being connected to the second input of amplifier 13. The device may have a second main amplifier 15 with a controlled gain factor, the input of which is connected to the output of amplifier 13 and output of amplifier 15 is connected to the input of feedback circuit 16 via the contacts of a switch 17.

The output of circuit 16 is connected to the second input of amplifier 15, the output of which is connected also with the input of demultiplexer 8.

The device comprises mixer 18, the inputs of which are connected with the outputs of shapers $10_1$, $10_2$ ... $10_n$ of the central and two extreme opposite channels and its output is connected to the input of additional amplifier 19 whose output is connected to the input of the second feedback circuit 16 via the contacts of switch 17.

The device may contain switchable divider 20 whose output is connected to inputs 21 and 22 of feedback circuits 14 and 16, multivibrator 23 the output of which is connected to one of the inputs of divider 20 and a time relay 24 whose output is connected to the second input of divider 20 and whose input 12 receives a start signal of time marking. Switch 25 connects the time relay 24 to the inputs of feedback circuits 14 and 16.

The device operates as follows:

The pulses of digital recorded information come to input 4 of converter 1 in which they are converted into an amplitude-pulse analog signal carrying time multiplexed information of all seismic channels. This signal comes to dynamic range recovery system 2 which simultaneously receives pulses of digital gain if they accompany digital information. At the output of system 2 appear signals brought to one scale, which may be at any point of a dynamic range (120–140db) similar to the input signal of a seismic recording system. The recovered signal represented by time multiplexed information of all the channels comes to AGC unit 5 in which the total energy of the time multiplexed information automatically compresses the dynamic range to a degree which provides for visual examination of signals of all channels on one seismic record and also allows preservation of the dynamic features of the information in the channels at a given moment of time at a low cost and with a simple design.

In the case of small signal amplitudes, the signal recovery may be accompanied by impulse noise which occurs in digital-to-analog converter 1 and dynamic range recovery system 2. In addition, it is necessary to provide normal operating conditions for the dynamic range compression system of the recording channel of a seismic recording system irrespective of field technique (in particular, Common Depth Point technique wherein arrivals of neighboring channels are more than 160 msec apart from each other), since in this case the total time energy in a multiplexed channel equals one twenty-fourth of the maximum possible energy with the same amplitude of the input signal whereby this energy may prove insufficient to provide reliable feedback control.

In this connection, AGC unit 5 may operate in any of the two possible modes.

In the first mode, both feedback circuits 14 and 16 receive the total signal of the time-multiplexed information for all seismic channels. In the second mode, in case the impulse noise is great or the first arrivals of the neighboring channels are far apart, the second feedback circuit receives signals of the extreme and central channels to eliminate the effect of geophone array with respect to shot point.

When the device is operating in the first mode, the signal from dynamic range recovery system 2 comes to the input of the first main amplifier 13 of AGC unit 5. (It should be noted that amplitude signals of all seismic channels are amplified in one amplifier, thus making the channels highly identical and economical. From the output of main amplifier 13, the signal is applied to feedback circuit 14 from whose output the d.c. voltage is applied to the second control input of the first main amplifier 13. This voltage changes the gain factor of amplifier 13 to an extent such that the variation range of the output voltage will be smaller than that of the input voltage, which results in certain compression of the latter.

However the obtained compression of the dynamic range may be insufficient to obtain a good seismic record. In this case, the signal from the output of the first main amplifier 13 is fed to the input of the second main amplifier 15 from whose output, via switch 17, it goes to the input of similar feedback circuit 16 operating as the first one and providing final compression of the dynamic range to a value providing for a good readable seismic record.

The compressed signal from the output of the second main amplifier 15 comes to the demultiplexer 8, which is controlled by clock pulses coming to input 9 from a magnetic tape (not shown in the drawing). From demultiplexer 8, the signal travels to continuous analog signal shapers $10_1, 10_2 \ldots 10_n$ from whose outputs the recovered analog signal is fed to oscillograph recorder 11.

When the device is operating in the second mode, switch 17 is set to another position and the output of the second feedback circuit 16 receives a signal from the output of additional amplifier 19 to whose output, via mixer 18, is fed an analog signal from the outputs of two extreme and one central shapers $10_1$, $10_n$ and $10_{n/2}$.

For the purpose of suppression at the beginning of the record, of getting more distinct first arrivals, and of speeding the operation of the feedback circuits and their smooth switching, as well as of reducing at the end of recording, the choice of the initial and final amplification in main amplifiers 13 and 15 is made by means of sending a high frequency a.c. signal from multivibrator 23 via switchable divider 20 to the second inputs of feedback circuits 14 and 16.

The multivibrator may be replaced by any other circuit capable of generating a voltage with certain initial and final magnitudes and with exponential transitions between them.

Switching of the amplification of amplifiers 13 and 15 from the initial to final magnitude and of the duration of holding the initial amplification magnitude is accomplished by means of electronic time relay 24 which controls divider 20. Time relay 24 is driven by a time break signal coming to input 12.

The device may also operate in a regime of programmed automatic gain control. In this case, the initial part of the seismic record is recorded in the above-mentioned manner during an interval fixed by the operator by means of time relay 24. After the end of the fixed time interval from the shot, whose time-break has been fed to input 12 of relay 24, the latter operates and via contacts of switch 25 prevents the signals from the outputs of main amplifiers from coming to feedback circuits 14 and 16 and acting on divider 20 provides thereby fixing of final amplification magnitudes.

What is claimed is:

1. A device for playback of information in multichannel digital seismic systems which record information in the form of time multiplex of channels with compression of the dynamic range, comprising: a digital-to-analog converter means including an input adapted to receive recorder information and an output at which is produced an analog signal carrying time multiplexed information; a dynamic range recovery means connected to the output of said converter means and including an output at which is produced signals brought to a common scale; an AGC unit for the signals which occur at the output of said recovery means, said AGC unit including an input and output, the latter said input being connected to the output of said recovery means; channel demultiplexer means including an input and outputs for each channel; the input of said demultiplexer means being connected with said output of said AGC unit; shapers for the continuous analog signals in each channel respectively connected to an output of said demultiplexer means, and an oscillograph connected to the output of said shaper, said AGC unit including a main amplifier with a controlled gain factor and which includes two inputs and one output, the first of the latter said inputs being connected to the output of said dynamic range recovery means and said output being connected to said input of said demultiplexer means; a feedback circuit including inputs and an output; one of the latter said inputs of the feedback circuit being connected to the output of said main amplifier, and the latter said output being connected to said second input of said main amplifier, said feedback circuit including a switchable divider means including inputs and an output connected to another input of said feedback circuit, a multivibrator including an output connected to one input of said divider, and a time relay including an input adapted to receive a start signal for the time marking of information recording and including an output connected to another input of said divider.

2. A device as claimed in claim 1, which comprises a mixer of signals provided from the outputs of said shapers of the central and two opposite extreme channels; the output of said mixer being connected to the input of said feedback circuit.

* * * * *